(12) United States Patent
Macrae (10) Patent No.: US 8,392,447 B2
(45) Date of Patent: Mar. 5, 2013

(54) SYSTEM AND METHOD FOR USING SYMBOL COMMAND LANGUAGE WITHIN A COMMUNICATIONS NETWORK

(75) Inventor: David N. Macrae, Nokomis, FL (US)

(73) Assignee: Bulletin.Net Inc., Sarasota, FL (US)

( * ) Notice: Subject to any disclaimer, the term of this patent is extended or adjusted under 35 U.S.C. 154(b) by 564 days.

(21) Appl. No.: 12/314,928

(22) Filed: Dec. 18, 2008

(65) Prior Publication Data

US 2010/0161638 A1    Jun. 24, 2010

(51) Int. Cl.
G06F 7/00      (2006.01)
G06F 17/30     (2006.01)

(52) U.S. Cl. ...................................................... 707/769

(58) Field of Classification Search ................... 707/769
See application file for complete search history.

(56) References Cited

U.S. PATENT DOCUMENTS

| | | | |
|---|---|---|---|
| 5,854,982 A | 12/1998 | Chambers et al. | |
| 6,018,724 A | 1/2000 | Arent | |
| 6,064,879 A | 5/2000 | Fujiwara et al. | |
| 6,401,085 B1 | 6/2002 | Gershman et al. | |
| 7,027,564 B2 | 4/2006 | James | |
| 2002/0103723 A1* | 8/2002 | Platner et al. | 705/27 |
| 2005/0091058 A1* | 4/2005 | Biettron et al. | 704/270.1 |
| 2005/0119946 A1* | 6/2005 | Cakiral | 705/27 |
| 2006/0180664 A1 | 8/2006 | Barrett et al. | |
| 2007/0066353 A1* | 3/2007 | Silverbrook et al. | 455/557 |
| 2007/0118514 A1* | 5/2007 | Mariappan | 707/3 |
| 2007/0161409 A1 | 7/2007 | Ohtsuki et al. | |
| 2008/0072139 A1 | 3/2008 | Salinas et al. | |
| 2008/0267504 A1* | 10/2008 | Schloter et al. | 382/181 |

OTHER PUBLICATIONS

U.S. Appl. No. 12/972,062, filed Dec. 17, 2010, Macrae.

* cited by examiner

Primary Examiner — Fred I Ehichioya
Assistant Examiner — Kris Mackes
(74) Attorney, Agent, or Firm — Afghani Law Firm; Kevin Afghani (57) ABSTRACT

A system and method for generating actions utilizing predefined commands within a communications network comprises predefined commands called symbol commands. These are character strings entered into an internet platform during an internet protocol session. The method and system can be used via the internet and is well-suited for mobile use. In addition, utilization of keywords and alpha-numeric or other character symbols to form symbol commands allows for complex command structuring. A search process is used in combination with a symbol command and a symbol command directory to identify specific goods and services, or related symbol commands. In addition, a platform performs specific predetermined actions in response to the symbol command such as making product purchases or providing services such as location-based services, coupon delivery or travel ticketing. The symbol command structure and internet platform will also utilize identification information associated with an individual user. Furthermore, the platform may implement a response using location information associated with the user from the country code, area code or prefix code of a user's telephone number, or use GPS location information associated with the user's internet device. The symbol command system and method provide an improved form of access to products and services via the internet.

60 Claims, 4 Drawing Sheets

USER IDENTITY (ID)
(phone number ID: sub-codes = WC + CC + EP)
(fixed IP address ID)
(user-defined ID)
(user-associated ID)
(other user ID)

SYMBOL COMMAND (SC)
(SC character string associated with a good or service)

SYMBOL COMMAND MESSAGE (SCM)
(SCM character string contains SC with any optional commands)

SMART FUNCTION (SSC)
(SSC - smart code associated with a processing function)
(SC platform defined)
(user defined)

KEYWORD OR FUNCTION COMMAND LAYER (KW or FN)
(KW designating qualitative)
(FN designating quantitative aspects to SCM)

FIG. 1

START

ACCESS
(user ID verification for user access to SC platform)

DATA INPUT
(SCM containing an SC is input into SC platform)

PROCESSING
(SC directory comparison at SC platform)

OPTIONAL DELIVERY
(distribution of good or service)

END

USER IDENTITY (ID)
(phone number ID: sub-codes = WC + CC + EP)
(fixed IP address ID)
(user-defined ID)
(user-associated ID)
(other user ID)

SYMBOL COMMAND (SC)
(SC character string associated with a good or service)

SYMBOL COMMAND MESSAGE (SCM)
(SCM character string contains SC with any optional commands)

SMART FUNCTION (SSC)
(SSC - smart code associated with a processing function)
(SC platform defined)
(user defined)

KEYWORD OR FUNCTION COMMAND LAYER (KW or FN)
(KW designating qualitative)
(FN designating quantitative aspects to SCM)

FIG. 4

ACCESS

LOGIN
(phone number, fixed IP address, geographical variable, HLR or VLR)

ACTIVE SESSION

SYMBOL COMMAND DIRECTORY SEARCH
(enter/process SCM (contains SC and any optional commands)

OPTIONAL SUPPLEMENTAL SEARCH

FINALIZE
(single-click, shopping cart)

OPTIONAL SMS AUTHENTICATION with PIN

BILLING PROCESSING/APPROVAL

PURCHASE ORDER PROCESSING
(SC platform accounting)
(user notification)

DELIVERY
(physical delivery, IP download or access, SMS, MMS)

SYSTEM AND METHOD FOR USING SYMBOL COMMAND LANGUAGE WITHIN A COMMUNICATIONS NETWORK

STATEMENT REGARDING FEDERALLY SPONSORED RESEARCH AND DEVELOPMENT

Not applicable.

REFERENCE TO SEQUENCE LISTING, A TABLE, OR A COMPUTER LISTING COMPACT DISC APPENDIX

Not applicable.

FIELD OF THE INVENTION

This invention relates to computer-implemented systems and methods utilizing pre-defined commands within a communications network to purchase or distribute goods, services, promotions, and products. The predefined commands are implemented through an internet platform. The internet platform has a user interface, such as a webpage, which can be displayed to a user on an internet accessible device. The predefined commands according to the invention are particularly preferred for use with a mobile internet device having a small form-factor and miniature-size screen. The predefined commands can be input manually by physical keystrokes as a string of individual characters or symbols using the mobile device. The predefined commands and any associated transactional data can also be entered other ways and further described herein in the illustrative examples and embodiments which follow.

This invention also relates to computer-implemented systems and methods for providing delivery of goods, services, promotions, and products through mobile and/or other electronic devices that have miniature size screens with lower screen resolution, e.g. cell phones, smart phones, PDAs, and the like, and methods and systems for providing delivery of the services, promotions, and products to take advantage of functionalities specific to certain mobile devices, such as cell phones, smart phones, hybrid PDAs, and so on.

This invention also relates to computer-implemented systems and methods for the communicating, processing, collecting, managing, analyzing and reporting of information relating to user choices and preferences for goods and services made using mobile and other electronic devices. In particular, the invention relates to methods and systems using the identity of the user. The user identity may be communicated directly by the user or be associated with a phone number or other information source associated with a user's identity. In addition, geographical or other information may be used in the methods and systems in communicating, processing, collecting, managing, analyzing and reporting of information relating to the users identity and activity. This information is particularly relevant to users of mobile devices and information gathered according to the present invention can be implemented for purposes such as advertising, marketing, and optimizing promotions, campaigns, orders, sales, subscriptions, and the like.

This invention also relates to computer-implemented systems and methods for enhancing the usability of mobile devices, and in particular, methods and systems for enhancing the user interface including but not limited to the representation of text identifiers or graphical objects on the internet device display in order to enable efficient selection of pre- defined commands or other options a user may follow when represented by text identifiers or graphical objects in the internet device display.

DEFINITIONS

The following abbreviations and defined terms apply to methods or systems of the inventions described in this document. Abbreviations include but are not limited to acronyms and short hand expressions:

AC—area code
AUC—authentication center
BSC—base station controller
BSS—base station system
BTS—base transceiver stations
CC—country code
CDMA—code division multiple access network
cHTML—compact hypertext markup language
CN—core network
CRT—cathode ray tube
CSC—common short code
DGPS—digital GPS
DPI—dot per inch
DSL—digital subscriber line
EIR—equipment identification register
EP—exchange prefix (telephone)
E911—enhanced 911 (mobile telephone location technology)
FC—function command
FPD—flat panel display
FTP—file transfer protocol
GMSC—gateway mobile service switching center
GPS—global positioning system
GSM—global system for mobile communications
GUI—graphical user interface
HLR—home location register
HPLMN—home public land mobile network
HTML—hypertext markup language
HTTP—hypertext transfer protocol
ID—identifier
IM—instant message
IP—internet protocol
IPLMN—interrogating public land mobile network
IR—infrared
ISDN—integrated services digital network
ISP—internet service provider
KW—keyword command
LAN—local area network
LBS—location based system
LCD—liquid crystal display
LED—liquid emitting diode (display)
MO—mobile originating (call or message)
MMS—multimedia messaging service
MSISDN—mobile station integrated services digital network number
MSC—mobile service switching center
MT—mobile terminating (call or message)
M2M—machine to machine
NDC—national destination code
PAN—personal area network
PDA—personal digital assistant
PIN—personal identification number
PLMN—public land mobile network
POS—point of sale
PPI—pixels per inch
RAN—radio access network
SC—symbol command SCM—symbol command message
"SC Directory"—symbol command directory
"SC Platform"—symbol command platform
"SC Webpage"—symbol command webpage
SMS—short message service
SN—subscriber number
SVGA—super visual graphics array
SXGA—super extended graphics array
SSC—smart symbol command
TDMA—time division multiple access network
TEL—telephone
TV—television
URL—uniform resource locator (web page address)
VGA—video graphics array
VLR—visitor location register
VPLMN—visited public land mobile network
W3C—world wide web consortium
WAAS—wide area augmentation system
WAN—wide area network
WAP—wireless application protocol
WIFI—wireless fidelity
WML—wireless markup language
XGA—extended graphics array
XML—extensible markup language
XHTML—xml-compliant version of HTML Definitions and defined terms include but are not limited to the following:

The term "symbol command" (SC), or "basic symbol command" (SC), means any user input string of one or more keyboard characters, such as an alpha, numeric or symbol function character such as "+", "_", "&", "%" "#" and the like, which identifies or accesses a specific corresponding predefined code, call, tag or any computer instruction whatsoever inserted in the markup language or program code of a webpage or programming module in a platform that is associated with specific good or service in a directory at a webpage or platform, said directory containing a listing of one or more specific goods or services, or functional commands for implementing distribution of these goods or services. Similarly, the terms "SC Directory", "SC Platform", and "SC Webpage" mean a directory or library of symbol commands, an internet platform or a webpage for processing symbol command(s) with the associated computing devices, computer programming modules or coding, and associated electronic peripherals.

The term "symbol command message" (SCM) means a complete character string message from a user received by a SC platform. A complete message includes at least one basic symbol command and optionally one or more smart commands, keyword commands or function commands that can be combined with the basic symbol command to form a symbol command message (SCM).

The term "smart symbol command" (SSC) means the association of a functional processing command with a basic symbol command (SC). The functional processing command is designated through an additional input character string of one or more keyboard characters, such as alphanumeric or symbol function characters. This additional character string accesses one or more specific or generic call commands in the markup language or source code of a webpage or platform. This references a script, binary, or executable code for modifying the execution of another symbol command associated with one or more specific goods or services within a webpage or platform coding. Similarly, the terms "keyword command" and "function command" mean functional associations with a basic symbol command relating to the quality or quantity of a good or service referenced by the basic symbol command.

The term "tag" means any code or computer instruction whatsoever inserted in markup language or source code of a webpage. A tag usually takes the form of "<tag> . . . </tag>" or "<tag [- . . . ]> . . . </tag>" or the like.

The term "call" means any code or computer instruction whatsoever inserted in the markup language or source code of a webpage that references a script, binary, or executable code. A "call" usually but does not necessarily take the form of "<!—#command—>", <#include> or the like.

The term "area code" means digits 1-3 of a 10-digit telephone number representing a unique code that corresponds to a particular geographic area, e.g. 202 is the area code for the city of Washington, D.C. In a full telephone number, the digits of "area code" typically precede the digits of the "exchange code". The term "area code" may also be known as "city code" and these terms may be used interchangeably.

The term "country code" means the number, e.g. typically two or three digits, that precedes the area code in a telephone number and is a unique code that corresponds to a particular country.

The term "delivery" means delivery in any form whatsoever including but not limited to physical delivery or electronic delivery by voice messages, text messages, IM, email with or without attached documents, multi-media including streaming, tickers, WAP, internet, messaging service, narrowcast, and so on, and may utilize any communication protocol such as IP, mobile IP, FTP, HTTP, HTTPS, and so on.

The term "device" means any electronic device including but not limited to mobile electronic devices or immobile electronic devices that are capable of either one-way or two-way communications including but not limited to cellular phones, handheld radios, pagers, laptop computers, notebook computers, ultra-compact computers, desktop computers, set-top boxes, cable boxes, satellite phones, video phones, PDAs, MP3 players, devices on-board vehicles including but not limited to planes, ships, cars or trucks, and so on, and RFID devices attached to other tangible items such as products, packaging, shelves, displays, signs, exhibits, and so on.

The term "exchange code" means digits 4-6 of a 10-digit telephone number or digits 1-3 of a 7-digit telephone number. In the latter context, the term "exchange code" may also be known as a "prefix", e.g. NXX, and these terms may be used interchangeably. In a full telephone number, the digits of "exchange code" typically follow the digits of the "area code".

The term "geographical variable" can include any variable, or combination of variables, whatsoever having information relating either directly or indirectly to geographical information including but not limited to latitude, longitude, street number, street name, cross-street name, residential address, billing address, neighborhood, city, county, state, country, zip code, telephone number, area or city code, exchange, IP address, building name, building number, floor number, station name, station number, call box number, survey point, landmark, and so on.

The term "identifier" means any information in any form whatsoever that uniquely identifies a user or a user's device including but not limited to a telephone number, a fixed IP address, a device identification number, a device's name, a user's name, a street address, a pre-assigned identification number, a user-defined passcode, a pre-assigned or user-defined username, birthplace, and so on.

The term "internet service provider" means any person or entity whatsoever that provides an access point to the internet including but not limited to telephone companies, telecommunications companies, cable companies, media companies and others as well as universities and other institutions, not-for-profits, community associations, government entities, and so on.

The term "IP location" means the act of locating a device by, or the location derived from, use of an IP address whether or not static or dynamic assigned address, based on the point of access.

The term "latitude" means the latitude of a device as measured in degrees, a combination of degrees and minutes, or a combination of degrees, minutes and seconds where a degree comprises 60 minutes and a minute comprises 60 seconds, or as measured in degrees with trailing decimals or as measured in degrees and minutes with trailing decimals. By convention, the latitude is often measured from the equator, with positive values to the north of the equator and negative values to the south of the equator.

The term "longitude" means the longitude of a device as measured in degrees, or a combination of degrees and minutes, or a combination of degrees, minutes and seconds where a degree comprises 60 minutes and a minute comprises 60 seconds, or as measured in degrees with trailing decimals or degrees and minutes with trailing decimals. By convention, the longitude is often measured from the prime meridian, with positive values to the east of the prime meridian and negative values to the west of the prime meridian.

The term "location" means the act of locating a device by, or the location derived from, use of GPS location, E911 location, RF location, telelocation, geographical variable, and so on.

The term "GPS location" means the act of locating a device by, or the location derived from, use of a Global Positioning System (GPS) in any form whatsoever, including but not limited to regular GPS based on satellite position data and assisted GPS (A-GPS), which uses some additional cellular network information. GPS Location is based on technique of "resection" where knowing the distance from an unknown location to a certain number of known locations allows the determination of the position, e.g. coordinates, of the previously unknown location.

The term "E911 location" means the act of locating using "enhanced 911", a location technology advanced by the FCC that enables mobile or cellular phones to process 911 emergency calls and enable public emergency services to locate the geographic position of the caller. The initial version of this technology involved location information associated with the nearest cell tower to a phone. The current technology required by the FCC includes either a handset- or network-based location detection capability so that a caller's location is determined by the geographic location of the phone to within one hundred meters accuracy of the latitude and longitude of the caller and not the location of the nearest tower that is transmitting its signal. The FCC refers to this as Automatic Location Identification (ALI) and it allows a wireless or mobile telephone to be located geographically using some form of radiolocation from the cellular network, or by using a Global Positioning System built into the phone itself.

The term "message" means information in any form whatsoever including but not limited to a text message, picture, photo, cartoon, audio, video, animation, presentation, and so on, and any combination of these forms include multi-media message, audio-video, voice over animation, voice over presentation, pictures or photos with captions, cartoons with captions or call-outs, and so on. A message can be information pushed by a customer to a device, requested by the user of the device, e.g. information about a popular destination, or initiated by any person, organization, or entity. A message may be initiated in response to a specific request or in response to an automated protocol.

The term "network" means any communications network, any subnetwork or any combination of these, including an ethernet, LAN, WAN, PAN, internet, intranet, extranet, wired network, wireless network, telephone network, cellular network, cable network, satellite network, a mesh of network connections or access points, and so on, including but limited to transmission via conventional electrical conductors, twisted pair, Cat-V, Cat-10, or Cat-100 cables, coaxial cables, fiberoptic cables, DSL, broadband, light transmission, laser transmission, and RF transmission at any frequency, and so on.

The term "telelocation" means the act of locating a device by, or the location derived from, use of a telephone number in any form whatsoever in whole or in part such as the 10-digit telephone number, a 7-digit telephone number without the area code (or city code), the area code (or city code) alone, the exchange code alone, and/or a combination of the area and exchange codes or the area code and exchange codes.

The term "telephone number" means a number that corresponds to a particular electronic device including but not limited to a mobile phone, PDA, an electronic device connected to a landline, and so on. A telephone number typically corresponds to an electronic device that is capable of voice communications but also correspond to an electronic device that is capable of voice, facsimile, text, and/or video communications.

The term "Public Land Mobile Network" (PLMN) means a communications network such as a global system for mobile communications (GSM) network, a time division multiple access (TDMA) network or code division multiple access (CDMA) network. Similarly, a PLMN can be functionally designated as a Home PLMN, a Visited PLMN, and an Interrogating PLMN. A "Home PLMN" (HPLMN) is the PLMN in a GSM network in which a GSM network user is a subscriber. The HPLMN functions as the user/subscriber's home network. The GSM user's subscription data resides in the HLR in that PLMN. A "Visited PLMN" (VPLMN) is a PLMN in a GSM network where a user/subscriber is currently registered. The user/subscriber may be registered in their HPLMN or in another PLMN. In the latter case, the subscriber is outbound roaming (from the HPLMN's perspective) and inbound roaming (from the VPLMN's perspective). When the subscriber is currently registered in their HPLMN, then the HPLMN is at the same time the user/subscriber's VPLMN. An "Interrogating PLMN" (IPLMN) is the PLMN containing the GMSC that handles mobile terminating (MT) calls. In general, MT calls are handled by a GMSC in the PLMN, regardless of the origin of the call. For most network operators, MT call handling is done by a GMSC in the HPLMN; in that case, the HPLMN is at the same time the IPLMN. This implies that calls destined for a GSM user/subscriber are generally routed to the HPLMN of that GSM subscriber. Once the call has arrived in the HPLMN, the HPLMN acts as IPLMN.

The term "MSISDN number" means a number used to identify a user/subscriber on a public land mobile network (PLMN) when, among other things, establishing a call to that user or sending an SMS message to that user. Hence, the MSISDN number is used for routing purposes. A typical MSISDN number structure contains a country code (CC) which identifies the country or group of countries of the user/subscriber; a national destination code (NDC)—each PLMN in a country has one or more NDCs allocated to it; the NDC may be used to route a call to the appropriate network; and a subscriber number (SN)—the SN identifies the user/ subscriber within the number plan of a PLMN. In terms of format structure, an MSISDN number is usually limited to a maximum of fifteen digits.

The term "GSM network" means a global system for a mobile communications network that generally includes the following functional parts:

MSC—the mobile service switching centre (MSC) is the core switching entity in the network. The MSC is connected to the radio access network (RAN); the RAN is formed by the base station controllers and one or more base transceiver stations (BSCs and BTSs) within a Public Land Mobile Network (PLMN). Users of the GSM network are registered with an MSC; all calls to and from the user are controlled by the MSC. A GSM network has one or more MSCs, geographically distributed.

VLR—the visitor location register (VLR) contains subscriber data for subscribers registered in an MSC. Every MSC contains a VLR. Although the MSC and VLR are individually addressable, in general, they are usually both contained in one integrated node.

GMSC—the gateway MSC (GMSC) is the switching entity that controls mobile terminating calls. When a call is established towards a GSM user/subscriber, a GMSC contacts the HLR of that subscriber, to obtain the address of the MSC where that subscriber is currently registered. That MSC address is used to route the call to that subscriber.

HLR—the home location register (HLR) is the database that contains a subscription record for each subscriber of the network. A GSM subscriber is normally associated with one particular HLR. The HLR is responsible for the sending of subscription data to the VLR (during registration) or GMSC (during mobile terminating call handling).

CN—the core network (CN) consists of, among other things, the MSC(s), GMSC(s) and HLR(s). These entities are the main components for call handling and subscriber management. Other main entities in the CN are the equipment identification register (EIR) and authentication centre (AUC); and BSS—the base station system (BSS) is composed of one or more base station controllers (BSC) and one or more base transceiver stations (BTS). The BTS contains one or more transceivers (TRX). The TRX is responsible for radio signal transmission and reception.

The term "mobile originated call" means the MSC that is handling the call is the serving MSC for the call and the calling user/subscriber is the served subscriber. Similarly, the term "mobile terminated call" means the GMSC that is handling the call is the serving GMSC for the call and the called subscriber is the served subscriber.

The term "ZIP location" means the act of locating a device by, or the location derived from, use of ZIP code in any form whatsoever including the 5-digit zip code, a portion of the ZIP code such as the 2 leading digits, the leading 3 digits, and so on, or the zip code plus 4 trailing digits.

The term "wireless service provider" means any person or entity whatsoever that provides access to the internet and/or other network(s) including but not limited to telephone companies, telecommunications companies, cable companies, media companies and any other commercial organizations as well as universities and other institutions, not-for-profits, community associations, government entities, and so on. Access may be WIFI (including any type of 802.11 network, e.g. 802.11b, 802.11a, 11g, 11n, dual-band, etc.), bluetooth (including any type of personal area network), broadband, or any other wireless protocol and may be connected through a wireless access point, a host device with wireless capability, or any other means of access such as a publicly accessible grid of devices (or mesh).

The term "screen" means any visual display including but not limited to a CRT, LED, LCD, FPD, TV, HDTV, projection screen, etc., and is used interchangeably with the term "visual display." A screen is capable of displaying M pixels by N lines whereby a screen with 800 pixels by 600 lines is capable of displaying 800 distinct dots on each of 600 lines, or about 480,000 pixels.

The term "screen resolution" means the clarity or sharpness of a display and is signified by the number of dots (pixels) on the entire screen and denoted by M pixels by N lines and is contrasted with unitized "resolution" which is signified by DPI or PPI.

The term "full size screen" means any visual display capable of a screen resolution of at least 800 pixels by 600 lines (e.g. SVGA), and typically has 1024 by 768 pixels (e.g. XGA), or 1248 by 1024 pixels (e.g. SXGA), 2048 by 1536 pixels (e.g. QXGA), and so on. The term "full size screen" also means any visual display regardless of type of hardware including but not limited to a CRT, LED, LCD, FPD, TV, HDTV, projection screen, and so on.

The term "miniature size screen" is a smaller viewing area screen and can refer to a visual display having a higher or lower resolution. Generally, a higher resolution is any screen with 800 pixels by 600 lines (e.g. SVGA), 1024 by 768 pixels (e.g. XGA), or 1248 by 1024 pixels (e.g. SXGA), 2048 by 1536 pixels (e.g. QXGA), and so on. Any screen that has fewer pixels than a full size screen including but not limited to 640×480 pixels (e.g. VGA), 320×240 pixels (e.g. QVGA), or 352×288 pixels (e.g. CIF), or 176×144 pixels (e.g. QCIF), and so on. The term "miniature screen" also means any visual display including but not limited a LED, LCD, FPD, TV, HDTV, and so on.

BACKGROUND OF THE INVENTION

Goods and services are widely available over the internet. However, purchasing goods and services on the internet often requires a preliminary internet search to locate a website providing a specific good or service desired by a user. In addition, after an appropriate website is located, the user must then also provide additional and detailed data to the website relating to (1) the user's identity, (2) billing information of a third-party relating to the user's source for purchase credit, and (3) user chosen delivery options. These data input tasks can be particularly challenging to a mobile user having a small form-factor mobile device, and especially due to the limited viewing access on the device for viewing the webpage and the smaller key-pad for providing data input through the device.

Within the telecommunications industry, and in particular with respect to the major wireless service providers in that industry, select goods or services can be associated with a numeric code known as a "short code" or Common Short Code (CSC) for access by a mobile user. Industry standard implementations of these CSC numbers are limited in that the CSC is merely used as a numeric code used for address identification and contains no other intrinsic function. Wireless service providers have deployed CSC short codes, which are phone numbers that are input via Short Message Service (SMS) text messages and forwarded by a user to the provider. Then the associated goods or services are ordered and billed for using the provider's billing systems.

In order for a distributor to obtain a CSC number for that distributor to associate with a good or service, the distributor must first lease or otherwise obtain a CSC number from a CSC trade association. Then the distributor must negotiate with each wireless service provider to support the leased CSC number. CSC numbers are unique within a domestic wireless service provider network system and only operate within an approving provider's network. When a distributor implements a CSC number this way, the distributor cannot use the CSC number internationally and the CSC number will have other cross-network limitations. Additionally, CSC numbers implemented this way through a wireless service provider's network do not operate through internet communication protocols for web-based applications.

The present invention is not in any way limited to just distributing a good or service associated with a Common Short Code (CSC). However, the systems and methods of the present invention provide for an alternate channel to distribute any good or service associated with a CSC, but without the typical difficulties associated with conventional CSC distribution channels, such as international boundaries or cross-network limitations. According to the present invention, these same goods and services can still be distributed through the domestic wireless service provider network systems in which a CSC has been approved. However, any regional, national or international communications network can be used in distributing the same goods and services.

PRIOR ART

U.S. Patent Application Pub. No. 2008-0248819 discloses a method for transmitting digital content to a mobile device by using a preliminary message sent to the device with the preliminary message listing choices of content. However, the mobile device user must first receive the preliminary message. No internet platform or directory of predefined commands, utilization of predefined commands with platforms and webpages for utilizing predefined commands are disclosed.

U.S. Patent Application Pub. No. 2008-0072139 discloses a method for presenting digital content to a mobile device using a webpage. The publication is directed to optimizing a webpage for presentation on a small screen mobile device. No internet platform or directory of predefined commands, utilization of predefined commands with platforms and directory of predefined commands are disclosed.

U.S. Patent Application Pub. No. 2007-0275738 discloses a system and method for translating and routing common short codes between wireless service provider networks. No predefined commands, utilization of predefined commands, or platforms and webpages for utilizing predefined commands are disclosed.

U.S. Patent Application Pub. No. 2007-0198339 discloses a method for transmitting promotional materials to a mobile device using webpages prepared by promotional distributors. However, the mobile device user must first conduct a search to locate the webpages. No predefined commands, utilization of predefined commands, or platforms and webpages for utilizing predefined commands are disclosed.

U.S. Patent Application Pub. No. 2007-0161409 discloses a system and method for using a cellular phone to access a search server on the internet. Although the publication uses the term "keyword" to conduct the search on the search server, this use of the term really describes a simple internet search for internet webpages. No predefined commands, utilization of predefined commands, or platforms and webpages for utilizing predefined commands are disclosed.

U.S. Pat. No. 7,356,337 discloses a system and method using a communications management module for managing GSM network functions such as correcting dialing sequences, translating short codes between networks, and setting roaming preferences. No predefined commands, utilization of predefined commands, or platforms and webpages for utilizing predefined commands are disclosed.

U.S. Pat. Nos. 6,049,835 and 6,769,018 disclose a system and method using a web-page to enter low-digit numeric codes, called "jump codes", to access the URL of a webpage associated with a specific jump code. The "jump codes" are merely a numeric identifier associated with a specific URL address of different webpage and are not directly associated with distributing goods or services. No predefined commands, utilization of predefined commands, or platforms and webpages for utilizing predefined commands are disclosed.

BRIEF SUMMARY OF THE INVENTION

The systems and methods of the present invention, in their most basic embodiments, involve an internet device and an internet platform having an interface, such as a webpage, which is presented to a user through the internet device. The internet platform also contains programming modules and a directory or library of predefined commands called symbol commands.

A symbol command (SC) is a character string forming a pre-defined command to call for an action by an internet platform on behalf of the user such as ordering or distributing a specific good or service. The internet platform, called a symbol command platform (SC platform), receives the SC character string from a user through the interface, typically a webpage, called a symbol command webpage (SC webpage). Typically, a user logs in by manually entering their identifier or this identifier is loaded automatically when the user's internet device connects to the SC webpage. The user identifier (ID) can be any unique ID associated with the user, such as the user's MSISDN number or their fixed IP address. In addition, the user ID can be a subset of one of these numbers, such as the final seven digits in a user's MSISDN number.

After a user obtains access to the SC platform through the SC webpage, the user can then enter a SC character string. This can be entered a number of different ways. In one embodiment, the SC webpage presents a data entry field provided for this purpose on the SC webpage which is displayed to the user on their internet device. Once entered through the SC webpage, the SC platform takes this data and processes the SC character string by comparing it with a symbol command directory (SC directory). The SC directory is a library of symbol commands and associated functional commands located in the SC platform or SC webpage programming. The SC directory defines the goods, services, or functions that can be associated with an SC character string. The initial comparison with the SC directory determines what action the SC platform will take in response to SC character string input by the user. The SC platform will then direct implementation of the SC, typically by providing specific goods or services through various channels in the communications network based on the specific SC which a user has entered. The internet-connected device can be any IP device, including a mobile device, a stationary personal computer or an IP access station. The SC character string input by the user can be any character string which is defined and stored in an SC directory accessible through the SC platform and SC webpage for providing specific goods or services.

An ordinary symbol command (SC) may be modified to become a "smart" symbol command (SSC) by adding further command language input characters to a basic SC character string defined within an SC directory and associated there with specific goods or services. The SSC input string provides an intelligent functionality to the basic SC as it influences or directs how the basic SC is processed through the computer coding and programming modules associated with the SC platform and/or the SC webpage.

Keyword (KW) commands and function (FN) commands may also be deployed through the SC platform in addition to SSC functionalities. A keyword (KW) command is an additional input command that activates another layer of functionality, such as a product type modifier or product delivery mode or some other predefined qualitative parameter. A KW command is coupled with at least one SC defining a good or service distributed through the SC platform. A function (FN) command is also a modifying input command that activates another layer of functionality associated with a quantity, such as a length, an amount or degree associated with the good or service associated with an SC. The SC platform implements keyword (KW) and function (FN) commands according to the precise attributes associated with each unique KW or FN command listed in the SC directory itself, or in code or programming modules associated with the directory. A keyword (KW) command can also be combined with a function (FN) command for implementation together by the SC platform.

The SC directory is a database in the SC platform that catalogues all the basic symbol commands, smart functionalities and other commands that are available to a user through the SC platform. The SC directory can be searchable or directly callable. According to optional embodiments, the SC webpage, the SC platform, or a separate database associated with either the SC webpage or the underlying SC platform, may be programmed to provide a choice of alternative symbol commands or smart functions to a user in response to the original SC character string input by a user. These choices are communicated from the SC platform to the user through the SC webpage, or by an alternative channel such as through an email, SMS, or MMS message the SC platform sends to the user's internet device. Using the alternative SC choices provided from the SC platform, a user can further define the specific good or service to be provided. In addition, all data associated with the interactive history that any user has with an SC platform, SC webpage or SC directory can be gathered for separate purposes. These purposes include augmenting a user's individual profile for programming improved responses to subsequent SC commands or other SC platform inquiries by the individual user. In addition, the historical data can be used for improving or augmenting the database associated with the SC directory used by many users. This data can also be used for demographic analyses, such as for the promotion or sales of a specific good or service associated with the SC directory.

The SC platform may also provide ancillary services or functions in conjunction with the distribution of goods or services associated with the SC platform. In optional embodiments, the SC platform can maintain a billing engine with a database containing user billing information, such as shipping method and delivery location information, credit card information, PayPal account access and the like, for pre-paid or post-paid transactions related to the goods or services provided through the SC platform. In optional embodiments, an SC platform might process transactions through the SC webpage via a simple "One-click" purchase process, or use another alternative such a "shopping cart", for processing multiple transactions or purchases. In other optional embodiments, the SC platform can provide security functions, including messages to the user relating to credit approval, purchase order validation and user authentication. One embodiment involves a two-way SMS secure user authentication process for high value or otherwise critical items provided through the SC platform. A two-way SMS authentication process involving sending a user an SMS requesting a PIN confirmation from the user is one such embodiment. The present invention provides an open and highly functional IP platform which can act as a universal webpage for buying goods and services, and in some embodiments, can be associated with a centralized and secure billing engine.

PREFERRED EMBODIMENT

Figure 1:
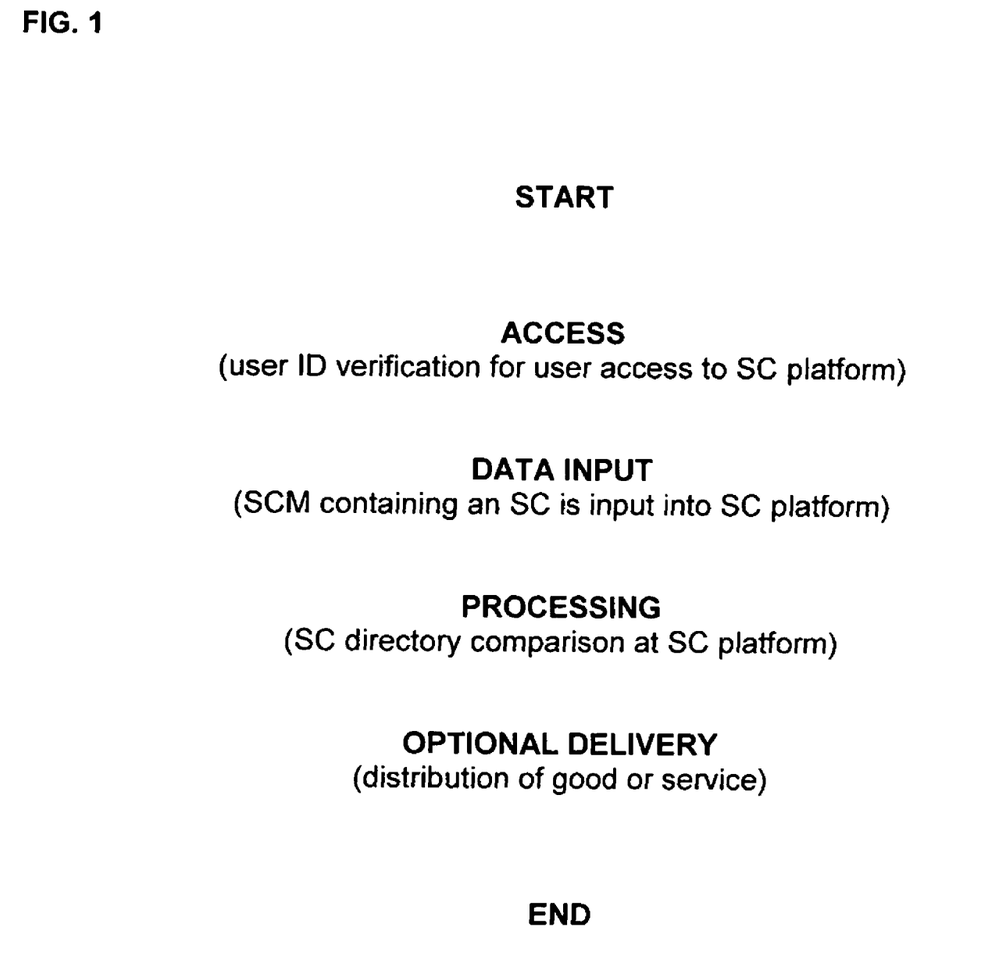
FIG. 1 is a flow diagram showing basic elements and steps in a system and method according to the invention.

According to the preferred embodiment the system and method of the present invention involves the basic method steps and system elements illustrated in FIG. 1. In reference to FIG. 1, in order to begin the method according to the preferred embodiment, a user ID is verified at the SC platform. The SC platform provides access based on a verified user ID provided by the user when the user interfaces with the SC webpage on an internet device. After access is granted, a user enters a SCM character string containing an SC into the SC platform through the interface. Typically the interface is a webpage. The SCM character string entered by the user is processed at the SC platform by comparing the SCM character string with an SC directory associated with the SC platform. Typically, the SC platform will then complete the method by implementing distribution of a specific good or service according to the SC character string specified by the user. Other SC platform processing outcomes are within the preferred embodiment of the invention.

DETAILED DESCRIPTION OF THE INVENTION

The SC platform is user accessible through conventional website access, direct IP commands M2M (machine to machine), or through SMS or other messaging means. SC website access can be accomplished through a URL stored in the user's device or a URL address which is directly entered by a user. In addition, the user can have a URL for a SC website pushed to their device via direct internet access, through an SMS or MMS message, an email, an IM, or any messaging means that will transmit an embedded URL for an SC webpage. The user can then access the SC platform through the embedded URL to the SC webpage.

An SC webpage structure is not limited and is formatted as needed to display on stationary devices or mobile devices, such as by authoring them in XHTML, WML, CHTML, HTML, among others. In one embodiment, the World Wide Web Consortium (W3C) structure is deployed. Regional domains such as www.XXXX.com.UK or other domains, such as org, .mobi and the like can be used in the URL for the SC webpage. The same SC can be active in more than one SC platform or SC webpage. The SC webpage loads to the user internet device when that device addresses a URL assigned to the SC webpage for interfacing with the SC platform. The URL assigned to the SC webpage is not limited.

According to one embodiment, a URL is entered manually by the user through an internet device using aspects in the SC platform that can be reflected in the URL address assigned to the SC webpage. For instance, according to another embodiment, a family of URL addresses might be reserved with names associated with SC webpages optimized for mobile device access, such as a WWW.MOBI type URL. This can be combined by also naming the URL using some geographical attribute associated with the goods and services provided through the SC platform. As an example, a WWW.MOBI.UK type URL is chosen for an SC platform which provides goods and services within the United Kingdom as the geographically pertinent area by a webpage optimized for access by a mobile device. In addition to manual entry of the URL, any URL might also be stored in memory, recorded as a bookmark by a browser application on the internet device, or otherwise stored in the device.

Figure 2:
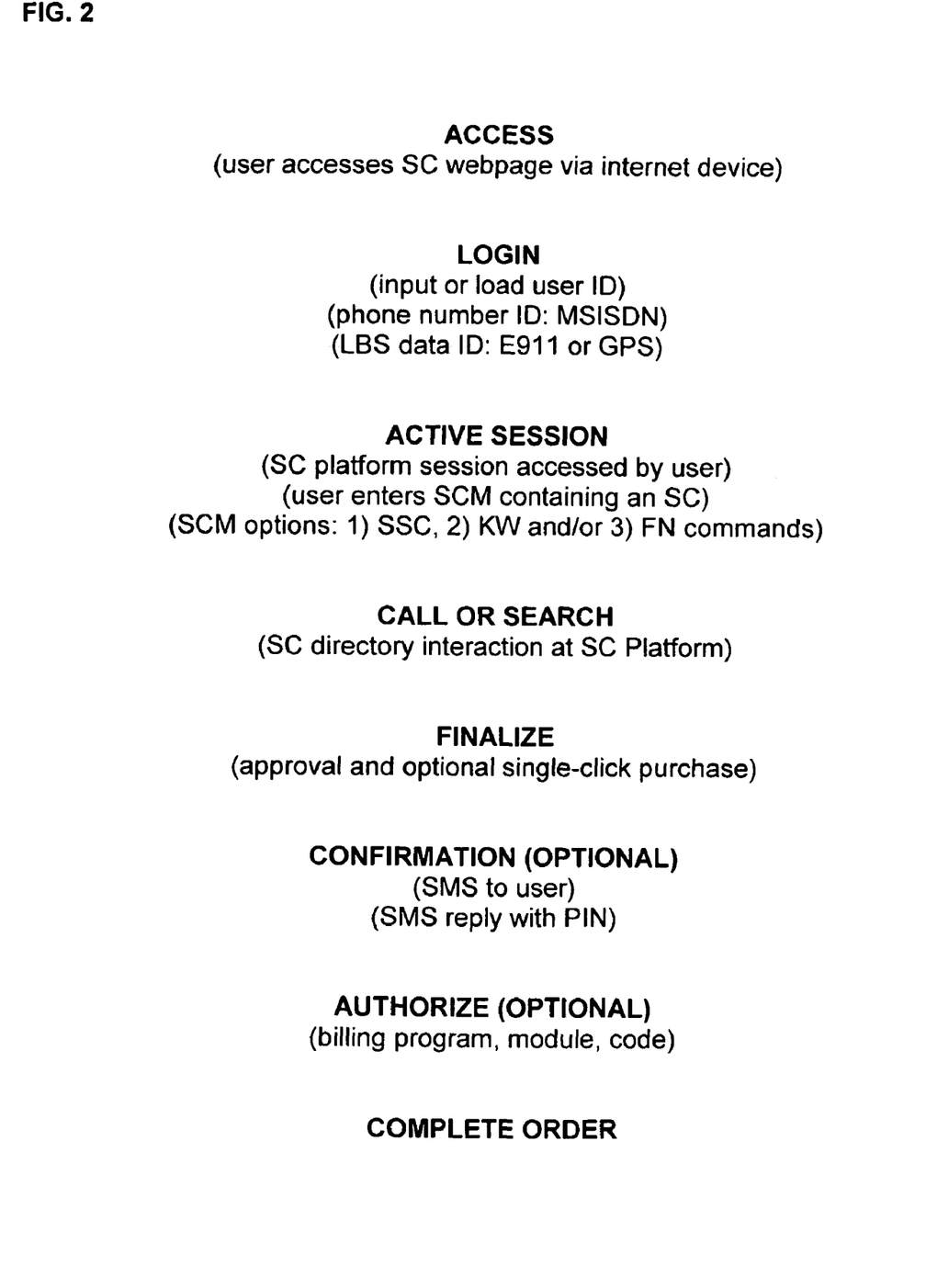
FIG. 2 is a flow diagram showing detailed elements and options associated with order processing in a system and method according to the invention.

Referring to FIG. 2, at least one form of identification is associated with the identity (ID) a user must provide in order for the user to be able to access the SC platform. The form of identification utilized for providing access is not limited. In one embodiment, a SC platform user will manually input their telephone number from the handset. In other embodiments, the user's telephone number will load automatically to the SC platform when the user accesses the webpage. The telephone number can be drawn automatically from any number of stored locations associated with the user's internet device, such as memory storage within the device, or taken from the user's HLR in a communications protocol associated with the user's device. If a fixed IP address is available, such as with a machine-to-machine embodiment and with some mobile devices, the fixed IP address can load for purposes of functioning as a user ID or user profile at the SC platform, or some part thereof.

A user registers their ID for identification and access to an SC platform. The user's ID is stored at the SC platform within the profile information associated with that user in a SC platform database. The user ID is then used by the SC platform for verification purposes whenever that user seeks to access the platform. According to select embodiments, when a user initially registers with an SC platform, the user may just limit entry of profile information to one data field, such as a phone number, to quickly complete a transaction through the SC platform that requires no additional information from the user. In another embodiment, for registration with the SC platform, the user is presented with a choice of different data fields for data to associate with their individual user profile at the SC platform. The user profile data fields will always relate the user's ID with the SC platform. But a user's profile information can also relate to billing information, a user personal identification number (PIN), a code or other authorization features, a phone number, an industry standard or other format associated with the phone number to infer location data from sub-codes in the phone number, a fixed IP address if available, physical address location fields such as a zip code, or any other data field that can be implemented through the platform in processing SC command language from the user to distribute goods and services. The user's profile at the SC platform is updated as needed so that the user profile fields maintain current information about the user for providing goods and services, and optionally for other purposes such as billing, through the SC platform.

According to one embodiment, a phone number and/or fixed IP address is used as at least a part of the user ID as identification for login purposes. Upon login at the SC platform, other verifications can also be employed such as a two way SMS which is sent to the user's internet device for the user to confirm their identity with a reply SMS message containing a user's PIN sent back to the SC platform. Alternative user ID identifications for providing access may be specifically defined by a user. In other embodiments, a user ID for access to the SC platform may involve other information that is associated with the user by some other source, or be combined with the other variants described above. Any part of the user identification ID used for access may be unique to an individual user. In an alternative embodiment, part of an individual user's identification ID may be associated also with other users to identify a set of users with similar profiles. Also, an individual user may access more than one SC platform or SC webpage with a single user ID or with multiple separate user IDs for parallel access by the user to the same or different SC platforms. In addition to a user ID, an SC platform may also use passwords as an additional security feature.

Once a user obtains access to an SC platform, typically through an SC webpage, a user will then provide as input a symbol command (SC) for processing at the SC platform. According to one embodiment, the SC character string is input through manual entry by the user through the user's physical keystrokes on an internet device keyboard. This input provides an SC character string in a data entry field provided on the SC webpage. When a complete character string has been entered, the user initiates processing of this SC character string, according to optional embodiments, by clicking on a graphical object on the SC webpage, by entry of a user command through the internet device, or through some other trigger. The SC platform then initiates processing of the modified SC character string using this additional data.

The invention is not limited to SC entry through physical keystrokes by the user on the user's internet device in order to accomplish initial entry of the character string for processing at the SC platform. In alternate embodiments, voice input is the basis for data entry. Voice data is translated to form a symbol command (SC) for processing. In one embodiment, the voice data is processed at the user internet device into an SC character string which is then entered to the SC platform for processing. In another embodiment, a programming module at the SC platform processes voice data taken directly from the user's internet device to form an SC character string for comparison with the SC directory at the platform. In another embodiment, the voice data is processed at the SC platform to form an SC character string which is then displayed on the SC webpage to the user through the user's internet device for user confirmation purposes. According to another embodiment, user entry of an SC character string is accomplished by keystroke entry on mobile tablets with a larger form-factor for data entry.

In another embodiment, a user's eyewear or another visual data communication user device, transmits user selected data forming or designating a symbol command (SC) through a direct connection with the user's internet device. If the user's eyewear or visual data device is a stand-alone computing device, the data designating a SC is transmitted through a local wireless connection, such as Bluetooth, to the user's internet device. Selection of a symbol command made through a user's eyewear, in select embodiments, is based on the visual projections of individual characters, SC character strings, text representations, or graphical objects which form an SC character string or designate a symbol command (SC).

Any of these or other visual projections can be displayed to the user through the user's visual device or eyewear.

Location based "telelocation" information is incorporated into the processing at the SC platform in a variety of ways. When a user ID is based on a phone number, the SC platform can infer location information associated with the user based on sub-code information from sub-codes in the telephone number such as the country code, area code or prefix code in the phone number. A telephone number structure typically includes a WC=World Command Number 2-8 digits, a global alpha-numeric code such as the universal 800 number; a CC=Country Code as defined in the MSISDN standard; an AC=Area Code as defined in the MSISDN standard; and an EP=Exchange Prefix as defined by the telephone industry as a switch identifier. When the SC platform responds to an SC command entered by a user, telephone number derived location data associated with the user can be used to condition processing or delivery of goods and services, or generate other responses, for location-based SC platform replies. The SC platform can extract any location-based information from any part of a user phone number. SC platform programming incorporates information regarding the relevant industry standards such as ISDN, MSISDN and international standards, in order for the SC platform programming to identify various sub-coded information within each industry standard format.

Location based information may also be provided to the SC platform based on Enhanced 911 (E911) or Global Positioning System (GPS) data provided by the user's internet device. In addition, data fields in the communication protocols commonly used by wireless service providers can provide further enhancements to how location based data is provided by a user to the SC platform. For instance, the registries for HLR (home location registry) and VLR (visitor location registry) fields are used in these protocols by wireless service providers and associated companies. These HLR and VLR registries contain information on user location that can also be input to the SC platform. As an example, if the VLR field associated with the user's device becomes active, this indicates a mobile user is "roaming" within a network. Modules to monitor and process this event are programmed within the SC platform to automatically load related information, such CC or AC associated with the user telephone number. If location based data such as GPS, or other forms of location identifying technology, are associated with a user through the user's internet device, this information is accepted automatically from the user's internet device at some point after a user accesses the SC platform. In addition, internet devices that are locatable based on another location based technology, such as E911, can utilize data from this alternate technology. The location based information from any of these sources is coordinated with any "smart" function code that may be input with a SC to condition the SC platform response following processing at the SC platform.

Figure 3:
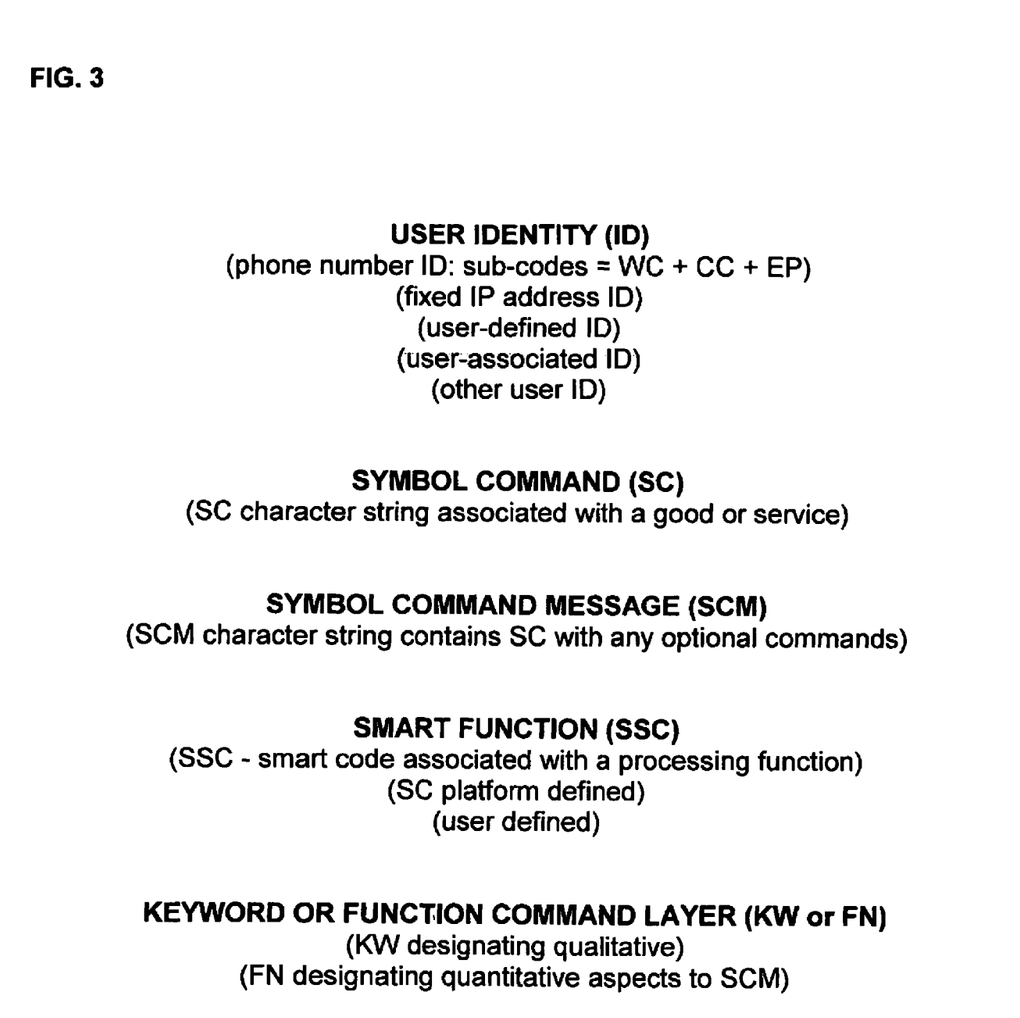
FIG. 3 is a listing of the basic data elements stored in databases associated with the SC platform and SC directory according to the invention.

Referring to FIG. 3, in the system and method according to the invention, character strings associated with a symbol command (SC), a "smart" symbol command (SSC) or a keyword (KW) or function (FN) command can be any combination of alpha-numeric characters, or other character symbols designated within an SC directory and associated with specific goods or services provided through the SC platform. The SC, SSC or KW and FN commands may be at least one of a number, a letter, multiples of letters, short words, and a number and a letter, or any combination thereof with other types of symbols, such as mathematic function symbols, Greek letter symbols and the like. In certain embodiments, an SC, SSC or combinations thereof with FN and KW commands in one character string will contain 1-200 characters, 1-100 characters, 1-80 characters, 1-60 characters, 1-40 characters, 1-30 characters, 1-20 characters, 1-15 characters, 1-10 characters, or any single increment between 1 and 100 characters in length.

Figure 4:
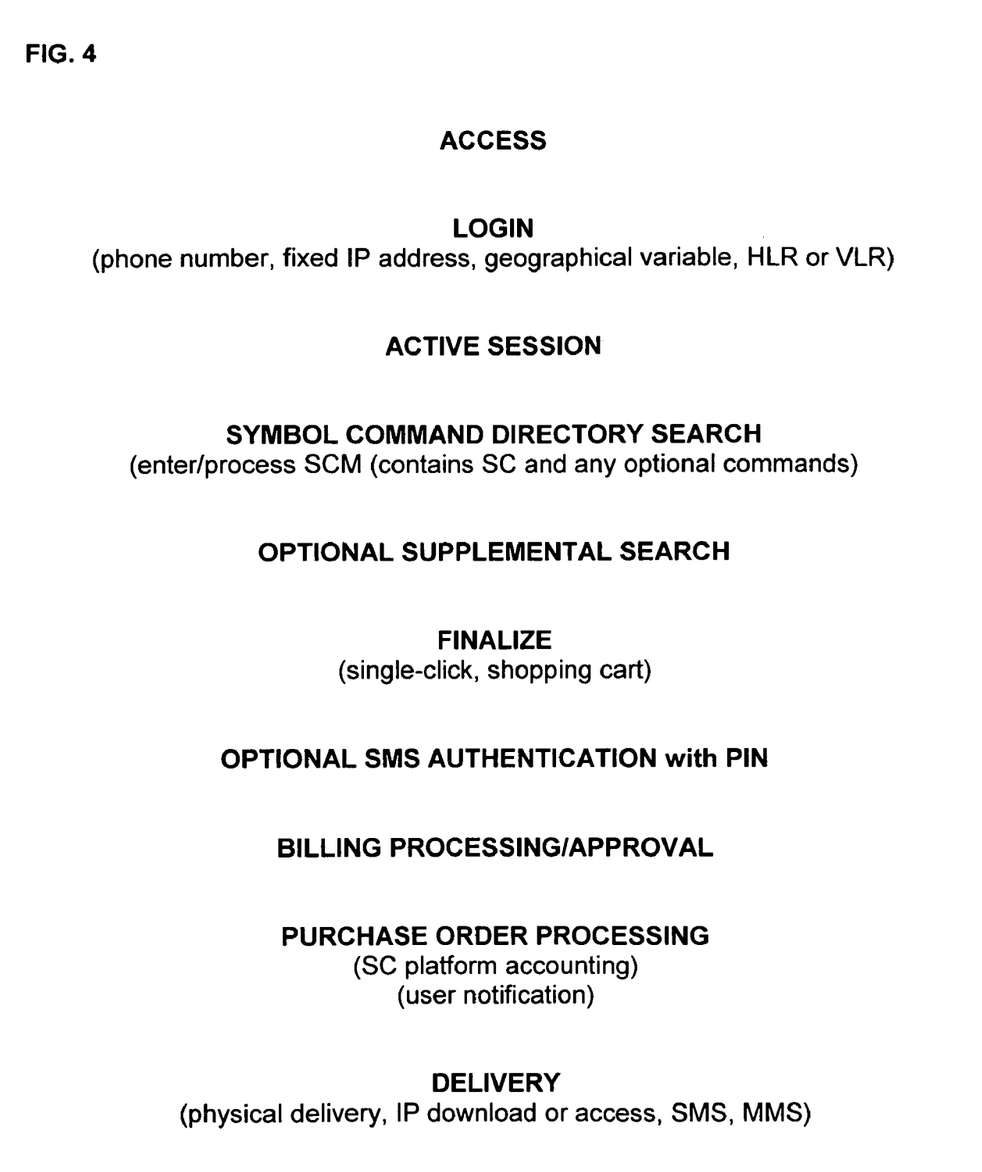
FIG. 4 is a flow diagram showing detailed elements and options associated with processing an SC request, placing an order and distributing goods and services in a system and method according to the invention.

Referring to FIG. 4, the SC platform, according to one embodiment, contains a billing program module. A user creates a billing relationship with the SC platform by registering and recording the user's billing information there. This information will include such items as normally contained in a billing database. In some embodiments, this billing information can include the user's phone number and other user ID identification information. The user ID information is used for session log in and also for purchasing authentication purposes allowing for a separate billing confirmation process utilizing a two way SMS message with PIN reply. The billing database is structured for pre-purchase payments or post-purchase payments and supports direct payments, PayPal, credit cards, debit cards and other forms of payment. The method includes receiving approval to purchase the selected item based on the SC from the user with one click of a user input device.

In other embodiments, alternative channels than the internet can be used in conjunction with the embodiments disclosed above. SMS, MMS, or email messages can be used as alternative distribution channels for such things as reminders or coupons associated with a purchase. In one embodiment, SMS; MMS, or email are used for sending coupons or messages that include bar code information.

The following examples illustrate some aspects of the invention and are not in any way limiting upon the invention disclosed and claimed.

Example 1

In this example, a user inputs a mobile URL to an internet device to access a SC webpage such as www.soda.mobi. An SC webpage is displayed and the user inputs a symbol command (SC), such as an A/N character string into a field on the webpage and clicks enter. The SC triggers a product or promotional material, such as a screen saver or coupon which is downloaded to the user internet device.

Example 2

In this example, a user inputs a mobile URL to an internet device to access a SC webpage such as www.company.mobi. An SC webpage is displayed with options of symbol command (SC) which can be searched by category such as coupons, sales offers, tickets, location based services, personal service offerings, or product offerings, such as games, videos, mobile TV, or music and the like. Selecting from these choices, a user inputs a SC and clicks enter. The SC platform associated with the SC webpage approves the SC product or service through user authentication, by sending a secure SMS requesting a PIN number input to approve the purchase. The user has a billing account with the SC platform and is charged for the product or service that is sent by physical delivery or download.

Example 3

In this example, a user implements a keyword (KW) command with an SC. After accessing the SC platform through an SC webpage, the user inputs "SODA" as the SC and "Coupon" as the KW. In this example the user is associated with a location based ID on their login at the SC platform by automatic loading of the user telephone number. The SC platform then forwards the request to the company server associated with the SC "SODA" and that server responds through the internet with local coupon offers to the user. If the user were traveling, they may also login using the CC+AC+EP in their phone number to indicate their current location or a target location for delivery.

Example 4

In this example, a user implements a function (FN) command with an SC. After accessing an SC webpage on the user's internet device, the user logs into a SC platform which automatically loads the user telephone number through the SC webpage as the user ID. The user then inputs "HVAC" as the SC, followed by the "+" symbol ((plus) symbol) to indicate an appended command, and then the number "72" as the function (FN) command. The SC platform processes this and then forwards a command directly to that user's home thermostat controller to set the temperature in the user's house to 72 degrees Fahrenheit. In an alternative embodiment, this command might be sent to a commercial service center to perform the same electronic service. In an alternative embodiment, the user might specify separate temperatures in different zones within the household by replacing the single temperature FN command "72" with the FN command "75-70-78" to designate the service to set three temperatures corresponding to three different zones in the user's household.

Example 5

In this example, a user implements a Common Short Code (CSC) through an SC platform with an SC command that includes the short code or a symbol command (SC) character string that corresponds in the SC directory with a specific good or service associated with the common short code (CSC). This would be the CSC corresponding to a good or service as provided by a wireless service provider that has authorized the CSC. In the alternative, the SC platform can define how the same good or service is to be distributed in a way that is completely independent of how the common short code (CSC) is authorized and distributed through a wireless service provider that has approved the CSC within its own network.

After accessing the SC platform through an SC webpage, the user inputs the CSC itself, or a symbol command (SC) which corresponds to a specific good or service otherwise associated with the CSC. The SC platform then implements distribution of the good or service according to independent SC platform criteria coded within the programming modules associated with the SC directory and SC platform. In the alternative, the SC platform is connected through the internet or other communication channels with a wireless service provider that has authorized the CSC for processing and distributing the same specific good or service. The SC platform communicates with the wireless service provider by sending data identifying the CSC and any user identification or other information the wireless service provider needs to complete the transaction and distribute the specific good or service according to the parameters for processing the CSC within the provider's network. In one embodiment, the SC platform passes this information to the wireless service provider through the VLR or HLR registries maintained within the provider's communications network. By providing alternate distribution channels, the SC platform provides a method for distributing the good or service associated with a common short code (CSC) outside just those networks of the wireless service provider which have authorized the CSC for use within their own networks.

Example 6

In this example, a user implements a "smart" symbol command (SSC) combined with both a keyword (KW) command and a function (FN) command, to set a vacation home security alarm to arm itself for active home security following a three hour delay after the SSC command is communicated to the home security device. After accessing an SC webpage, an automatic login associates the user with the SC platform, containing information about the user's MSISDN number and vacation home residence information. The user then inputs the SSC command "VH" to indicate smart processing at the SC platform relating to the user's vacation home, appended to SECUR" as the basic SC to access a home security service. This input is followed by a "+" symbol ((plus) symbol) to indicate an appended command, then followed by the number "3" as the function (FN) command, and then followed with another "+" symbol ((plus) symbol) to indicate a second appended command and then the command "ARM" as the keyword (KW) command. The complete SSC character string is "VHSECUR+3+ARM" which is manually entered by the user through the user's internet device. The SC platform processes this complete SSC character string and implements delivery of the electronic service by communicating instructions to the security device in the user's vacation home to arm itself after a three hour delay.

Example 7

In this example, a user interacts with the SC platform with only partial information and the SC platform responds with options for the user to complete the SC platform transaction. A user enters "PIZZAH+AC" which incorporates the SC "PIZZAH" for home delivery of pizza followed by the KW command "AC" for home delivery of pizza within the user's own Area Code (AC). Given that more than one pizza delivery service is available within the user's area code, the SC platform receives this partial SC and upon processing, returns a list of further limiting choices for the user to the SC webpage. The list is displayed on the SC webpage as graphical objects representing specific commercial services as choices for the pizza delivery. The user then clicks on any of these graphical objects indicating a modification to the original SC command. The SC platform then processes this modified SC command and implements home delivery of the pizza as indicated by the user and charges the user for the delivered pizza using billing information maintained in the user's profile within the SC platform.

In an alternative embodiment, the user enters "PIZZAH+AC202" for a list of choices within the 202 area code, as opposed to the user's own area code. An alternative to this example is practiced with variants utilizing information relating to Country Code (CC), Area Code (AC), and Exchange Prefix (EP). In addition, other Location Based System (LBS) information, such as GPS or E911, might be utilized, through a user entering "PIZZAH+LBS1M" for all pizza home delivery services located within a one mile radius of the current location of the user's internet device. By adding the KW command "COUPON", the user can also have the SC platform forward a message to the user's internet device, by SMS or other means, for coupons associated with the pizza service delivering the pizza that can be redeemed when the pizza is delivered.

Example 8

In this example, a user orders travel tickets with any coupons that might be associated with the purchase through the SC platform. The associated coupons contain visual data, such as bar code information. Because the SC webpage generally does not persist in memory on a user's internet device, the platform will modify delivery of bar code coupons to the user in a manner that allows the bar code data to reside with the user's internet device until the coupons can be redeemed when claiming the purchased travel tickets. These bar code coupons are sent by MMS, email, as a picture or other form of image delivery which persists in the device and are readable by scanners linked to the retail merchant to scan and validate with the ticket.

A user enters "AMTRAK+DC-PA+530PM+FC" to order train tickets and obtain a confirmation for will-call pickup. This SCM would be for a ticket from Washington D.C. to Philadelphia at 530 PM in first class. In one embodiment, the user would authenticate by getting a pin SMS to validate and then a confirmation number for will call or a barcode for automated ticketing. To the SCM, the user also adds the keyword (KW) command "COUPON" for a coupon to any available upgrades or amenities the train company associates with the user and the purchase. The SC platform processes the SC with the KW command for coupons. The purchasing charges from the SC platform would go directly to an Amtrak account or an account such as PayPal. If the train were fully reserved, sold out, or the entered time frame did not directly correspond with the trains schedule at the preferred time, a schedule can be presented with alternate choices the nearest time before and after with avail seats can be presented. Similarly, of first class were full then other tickets or scheduling might be presented through the SC platform. After final choices were made, the train company would then respond with information for will-call confirmation and digital data for coupons that include visual data relating to a bar code, such as an Aztec Matrix Code, that must be scanned for entry. The SC platform can notify the user through the SC webpage, but will also forward a digital copy of the bar code coupons to the user's internet device by SMS, MMS, email or some other message means that preserves a digital copy of the bar code coupon and remains accessible to the user's internet device after that device has powered off or is otherwise disconnected from the SC webpage.

Symbol Command (SC) Platform Computing Device

Computing devices for operating the SC platform are used to implement the systems and methods described herein, as either a client or as a server or plurality of servers. A computing device is intended to represent various forms of digital computers, such as laptops, desktops, workstations, personal digital assistants, servers, mainframes, and other appropriate computers. A user internet device can be various forms of mobile devices, such as personal digital assistants, cellular telephones, smart phones, and other similar computing devices. The components described herein, their connections and relationships, and their functions, are meant to be exemplary only, and are not meant to limit implementations of the inventions described and/or claimed herein.

A computing device includes a processor, memory, a storage device, a high-speed interface connecting to memory and high-speed expansion ports, and a low speed interface connecting to low speed bus and storage device. Each of the components, are interconnected using various busses, and may be mounted on a common motherboard or in other manners as appropriate. The processor can process instructions for execution within the computing device, including instructions stored in the memory or on the storage device to display graphical information for a GUI on an external input/output device, such as display coupled to high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of servers, or a multi-processor system).

The memory stores information within the computing device. In one implementation, the memory is a computer-readable medium. In one implementation, the memory is a volatile memory unit or units. In another implementation, the memory is a non-volatile memory unit or units.

The storage device is capable of providing mass storage for the computing device. In one implementation, the storage device is a computer-readable medium. In various different implementations, the storage device may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory, the storage device, memory on processor, or a propagated signal.

The high speed controller manages bandwidth-intensive operations for the computing device, while the low speed controller manages lower bandwidth-intensive operations. Such allocation of duties is exemplary only. In one implementation, the high-speed controller is coupled to memory, display (e.g., through a graphics processor or accelerator), and to high-speed expansion ports, which may accept various expansion cards. In the implementation, low-speed controller is coupled to a storage device and a low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device may be combined with other components in a mobile device. Each of such devices may contain one or more of computing device and an entire system may be made up of multiple computing devices communicating with each other.

The user internet device and the computing device may communicate wirelessly through communication interface, which may include digital signal processing circuitry where necessary. The communication interface may provide for communications under various modes or protocols, such as IP, GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as by using a Bluetooth, WiFi, or other such transceiver. In addition, a GPS receiver module may provide additional wireless data to device, which may be used as appropriate by applications running on device.

User Internet Device or User Communications Device

The user internet device may be implemented in a number of different forms that are mobile or fixed. For example, it may be implemented as a cellular telephone with IP capabilities. It may also be implemented as part of a smartphone, personal digital assistant, or other similar mobile device. Digital computers, such as laptops, desktops, workstations, personal digital assistants, servers, mainframes, and other appropriate computers may also be used.

The internet device may also communicate data audibly using audio codec, which may receive spoken information from a user and convert it to usable digital information. Audio codex may likewise generate audible sound for a user, such as through a speaker, e.g., in a handset of the device. Such sound may include sound from voice telephone calls, may include recorded sound (e.g., voice messages, music files, etc.) and may also include sound generated by applications operating on device.

Symbol Command (SC) Platform Programming

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, module, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network. The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Other Embodiments

In one embodiment, the invention is directed to an internet-based delivery platform connected to a communications network for distributing goods or services based on information sent from an internet device to the delivery platform, said platform comprising: a computing device and a computer operations program, module or code for operating an internet-based delivery platform; an internet interface accessible by a user internet device, said internet interface configured for receiving a symbol command message including a symbol command; a symbol command directory with a database having a plurality of symbol commands; a comparison program, module or code for comparing the symbol command in the symbol command message with the plurality of symbol commands in the database of the symbol command directory; and a distribution program, module or code for implementing a distribution of a good or service associated in the symbol command directory with the symbol command in the symbol command message.

In other embodiments, the invention is directed to a platform wherein the symbol command directory includes one or more smart symbol commands and a comparison program, module or code for comparing a smart symbol command in the symbol command message with one or more smart symbol commands listed in the database of the symbol command directory; wherein the symbol command directory includes one or more keyword commands and a comparison program, module or code for comparing a keyword command in the symbol command message with one or more keyword commands listed in the database of the symbol command directory; or wherein the symbol command directory includes one or more function commands and a comparison program, module or code for comparing a function command in the symbol command message with one or more function commands listed in the database of the symbol command directory.

In still other embodiments, the invention is directed to a platform wherein the computer operations program, module or code is associated with a database for maintaining a profile associated with a user, said database including at least one user identification data field for holding user identity data; wherein the user identity data is associated with a phone number, a fixed IP address, an identifier defined by the user, or another identifier associated with the user; wherein the user identity data is associated with a MSISDN number, a part of a MSISDN number, a fixed IP address, or an ID defined by or associated with the user; wherein the computer operations program, module or code includes coding for a process for verifying a user's identity a) prior to granting a user access to the platform and/or b) a) after granting a user access to the platform; wherein the computer operations program, module or code includes coding for a process for accepting manual input of data associated with a user's identity; wherein the computer operations program, module or code includes coding for a process for accepting automated input of data associated with a user's identity; wherein the automated input of data is loadable from a user's internet device; wherein the automated input of data is loadable from a location associated with a communications network connectable with the platform or a user's internet device; and wherein the communications network connectable with the platform or the user's internet device is a) the internet or b) a GSM, TDMA, CDMA or satellite communications network network.

In yet still other embodiments, the invention is directed to a platform wherein a platform database includes at least one data field for user billing information data; wherein a platform database includes at least one data field for user authentication data for authenticating the identity of a user when a) providing a user access to the platform or b) processing a purchase or distribution of goods or services distributed through the platform; wherein the user authentication data corresponds with a PIN associated with the user; wherein a platform database includes at least one data field for holding location information for locating or delivering goods or services distributed using the platform; wherein the data field for location information is configured to hold data associated with a telelocation; wherein the data field for location information is configured to hold data associated with a global positioning system location; wherein the data field for location information is configured to hold data associated with an E911 location; wherein the data field for location information is configured to hold data associated with a HLR or VLR registry in a GSM network; wherein the data field for location information is configured to hold data associated with a geographic variable location; wherein the interface is a webpage; wherein the webpage has an input field for receiving entry of a symbol command message; wherein the computer operations program, module or code includes coding for a one-click purchasing process; wherein the computer operations program, module or code includes coding for sending a response to a user after a symbol command is processed at the platform; wherein the coding for a response specifies sending the response to the interface; or wherein the coding for a response specifies sending the response by IM, SMS, MMS or email message.

In another embodiment, the invention is directed to a method of using an internet platform connected to a communications network, said method comprising: providing a user access to the internet platform through an interface; receiving at the platform a symbol command message including a symbol command; comparing at the platform the symbol command message to a symbol command directory associated with a database; and implementing a response by the platform based on the symbol command message.

In other embodiments, the invention is directed to a method wherein the response includes distributing a good or service associated with the symbol command in the symbol command message; wherein the response includes processing of a purchase of a good or service associated with the symbol command in the symbol command message; wherein the response includes sending a request for information associated with the symbol command message; wherein the comparing includes comparing a smart symbol command, a keyword command or a function command in the symbol command message with one or more smart symbol commands, keyword commands or function commands listed in the database of the symbol command directory; wherein the providing user access step includes verifying the identity of a user; wherein the processing of a purchase includes verifying the identity of a user; or wherein the verifying the identity of a user includes authenticating a user through sending an IM to the user requesting a PIN or other authentication response from the user.

In still other embodiments, the invention is directed to a method wherein the verifying the identity of a user includes a comparing of the user identity with data associated with a user profile at the platform, said data associated with a) a phone number, b) a fixed IP address, c) an identifier defined by the user, or d) another identifier associated with the user; wherein the phone number is a MSISDN number; wherein the response includes sending information for presentation to the user through the interface; wherein the response includes sending information for presentation to the user through an IM, SMS, MMS or email message; wherein the information for presentation to the user sent through an IM, SMS, MMS or email message includes information in a bar code format; or wherein the response by the platform is associated with location information for locating or delivering goods or services distributed using the platform.

In yet still other embodiments, the invention is directed to a method wherein the location information is associated with a telelocation; wherein the location information is associated with a global positioning system location;

wherein the location information is associated with an E911 location; wherein the location information is associated with an HLR or VLR registry in a GSM network; wherein the location information is associated with a geographic variable location; wherein the interface is a webpage; wherein the webpage has an input field for receiving entry of a symbol command message; or wherein the purchase includes a single-click process associated with the purchase.

In another embodiment, the invention is directed to an internet-based system for ordering and distributing goods or services comprising: a) an internet device; and b) an internet-based delivery platform that is an internet-based delivery platform connected to a communications network for distributing goods or services based on information sent from an internet device to the delivery platform, said platform comprising: a computing device and a computer operations program, module or code for operating an internet-based delivery platform; an internet interface accessible by a user internet device, said internet interface configured for receiving a symbol command message including a symbol command; a symbol command directory with a database having a plurality of symbol commands; a comparison program, module or code for comparing the symbol command in the symbol command message with the plurality of symbol commands in the database of the symbol command directory; and a distribution program, module or code for implementing a distribution of a good or service associated in the symbol command directory with the symbol command in the symbol command message.

In other embodiments, the invention is directed to a system wherein the internet device is a mobile device; wherein the internet device is a phone; wherein the symbol command directory includes one or more smart symbol commands and a comparison program, module or code for comparing a smart symbol command in the symbol command message with one or more smart symbol commands listed in the database of the symbol command directory; wherein the symbol command directory includes one or more keyword commands and a comparison program, module or code for comparing a keyword command in the symbol command message with one or more keyword commands listed in the database of the symbol command directory; wherein the symbol command directory includes one or more function commands and a comparison program, module or code for comparing a function command in the symbol command message with one or more function commands listed in the database of the symbol command directory; wherein the computer operations program, module or code is associated with a database for maintaining a profile associated with a user, said database including at least one user identification data field for holding user identity data for verifying the identity of a user; wherein the user identity data is associated with a phone number, a fixed IP address, an identifier defined by the user, or another identifier associated with the user; wherein the user identity data is associated with a MSISDN number, a part of a MSISDN number, a fixed IP address, or an ID defined by or associated with the user; or wherein the computer operations program, module or code includes coding for a process of verifying a user's identity a) prior to granting a user access to the platform and/or b) a) after granting a user access to the platform.

In another embodiment, the invention is directed to a communications network-based delivery platform connected to a communications network for distributing goods or services using information sent from a communications device to the delivery platform, comprising: an interface accessible by a user communications device, said interface being configured for receiving a symbol command message including a symbol command; a symbol command directory with a database having a plurality of symbol commands; a comparison program, module or code for comparing the symbol command in the symbol command message with the plurality of symbol commands in the database of the symbol command directory; and a distribution program, module or code for implementing a distribution of a good or service associated in the symbol command directory with the symbol command in the symbol command message.

In another embodiment, the invention is directed to a method of using data gathered from distributing goods or services using information sent from an internet device to an internet platform, comprising: collecting a data record of a) a symbol command message received at the platform, b) a platform response to the symbol command message or c) both the symbol command message and the platform response to form a historical data record.

A number of embodiments of the invention have been described. Nevertheless, it will be understood that various modifications may be made without departing from the spirit and scope of the invention. For example, although certain platforms, systems and methods have been shown, the particular components of each platform, system and method may be rearranged as appropriate, and additional components may be added, or components may be combined, separated, or eliminated, as appropriate. Also, although much of the disclosure speaks to mobile devices and platforms and systems with an interface for display on mobile devices, in appropriate circumstances, the features described here may be applied to non-mobile devices also. Accordingly, other embodiments are within the scope of the following claims.

What is claimed is:

1. An internet-based delivery platform connected to a communications network for distributing goods or services based on information sent from an internet device to the delivery platform, said platform comprising:
    a) a computing device and a computer operations program, module or code for operating an internet-based delivery platform;
    b) an internet interface accessible by a user internet device, said internet interface configured for receiving a symbol command message including a smart symbol command from a user, wherein the smart symbol command comprises a basic symbol command and at least one of a functional command or a keyword command that modifies the basic symbol command, wherein the functional command defines a quantitative parameter of a good or service associated with the basic symbol command, and the keyword command defines a qualitative parameter of a good or service associated with the basic symbol command;
    c) a symbol command directory with a database having a plurality of basic symbol commands that are associated with one or more goods or services, and one or more functional and keyword commands;
    d) a comparison program, module or code for comparing at least a part of the symbol command message with the plurality of basic symbol commands and the functional and keyword commands listed in the database of the symbol command directory; and
    e) a distribution program, module or code for bypassing an internet website to directly implement a distribution of a good or service associated in the symbol command directory with the basic symbol command according to the at least one functional command or keyword command in the symbol command message to prevent a direct interfacing between the user and a separate vendor distributing the good or service.

2. The platform according to claim 1, wherein the symbol command directory includes one or more smart symbol commands and a comparison program, module or code for comparing the smart symbol command in the symbol command message with one or more smart symbol commands listed in the database of the symbol command directory.

3. The platform according to claim 1, wherein the symbol command directory includes one or more keyword commands and a comparison program, module or code for comparing a keyword command in the symbol command message with one or more keyword commands listed in the database of the symbol command directory.

4. The platform according to claim 1, wherein the symbol command directory includes one or more function commands and a comparison program, module or code for comparing a function command in the symbol command message with one or more function commands listed in the database of the symbol command directory.

5. The platform according to claim 1, wherein the computer operations program, module or code is associated with a database for maintaining a profile associated with a user, said database including at least one user identification data field for holding user identity data.

6. The platform according to claim 5, wherein the user identity data is associated with a phone number, a fixed IP address, an identifier defined by the user, or another identifier associated with the user.

7. The platform according to claim 5, wherein the user identity data is associated with a MSISDN number, a part of a MSISDN number, a fixed IP address, or an ID defined by or associated with the user.

8. The platform according to claim 5, wherein the computer operations program, module or code includes coding for a process for verifying a user's identity a) prior to granting a user access to the platform and/or b) after granting a user access to the platform.

9. The platform according to claim 5, wherein the computer operations program, module or code includes coding for a process for accepting manual input of data associated with a user's identity.

10. The platform according to claim 5, wherein the computer operations program, module or code includes coding for a process for accepting automated input of data associated with a user's identity.

11. The platform according to claim 10, wherein the automated. input of data is loadable from a user's internet device.

12. The platform according to claim 10, wherein the automated input of data is loadable from a location associated with a communications network connectable with the platform or a user's internet device.

13. The platform according to claim 12, wherein the communications network connectable with the platform or the user's internet device is a) the internet or b) a GSM, TDMA, CDMA or satellite communications network.

14. The platform according to claim 5, wherein a platform database includes at least one data field for user billing information data.

15. The platform according to claim 5, wherein a platform database includes at least one data field for user authentication data for authenticating the identity of a user when a) providing a user access to the platform or b) processing a purchase or distribution of goods or services distributed through the platform.

16. The platform according to claim 15, wherein the user authentication data corresponds with a PIN associated with the user.

17. The platform according to claim 5, wherein a platform database includes at least one data field for holding location information for locating or delivering goods or services distributed using the platform.

18. The platform according to claim 17, wherein the data field for location information is configured to hold data associated with a telelocation.

19. The platform according to claim 17, wherein the data field for location information is configured to hold data associated with a global positioning system location.

20. The platform according to claim 17, wherein the data field for location information is configured to hold data associated with an E911 location.

21. The platform according to claim 17, wherein the data field for location information is configured to hold data associated with a HLR or VLR registry in a GSM network.

22. The platform according to claim 17, wherein the data field for location information is configured to hold data associated with a geographic variable location.

23. The platform according to claim 1, wherein the interface is a webpage.

24. The platform according to claim 23, wherein the webpage has an input field for receiving entry of a symbol command message.

25. The platform according to claim 1, wherein the computer operations program, module or code includes coding for a one-click purchasing process.

26. The platform according to claim 1, wherein the computer operations program, module or code includes coding for sending a response to a user after a symbol command is processed at the platform.

27. The platform according to claim 26, wherein the coding for a response specifies sending the response to the interface.

28. The platform according to claim 26, wherein the coding for a response specifies sending the response by IM, SMS, MMS or email message.

29. An internet-based system for ordering and distributing goods or services comprising:
   a) an internet device; and
   b) an internet-based delivery platform according to claim 1.

30. The system according to claim 29, wherein the internet device is a mobile device.

31. The system according to claim 29, wherein the internet device is a phone.

32. The system according to claim 29, wherein the symbol command directory includes one or more smart symbol commands and a comparison program, module or code for comparing the smart symbol command in the symbol command message with one or more smart symbol commands listed in the database of the symbol command directory.

33. The system according to claim 29, wherein the symbol command directory includes one or more keyword commands and a comparison program, module or code for comparing the keyword command in the symbol command message with one or more keyword commands listed in the database of the symbol command directory.

34. The system according to claim 29, wherein the symbol command directory includes one or more function commands and a comparison program, module or code for comparing the function command in the symbol command message with one or more function commands listed in the database of the symbol command directory.

35. The system according to claim 29, wherein the computer operations program, module or code is associated with a database for maintaining a profile associated with a user, said database including at least one user identification data field for holding user identity data for verifying the identity of a user.

36. The system according to claim 29, wherein the user identity data is associated with a phone number, a fixed IP address, an identifier defined by the user, or another identifier associated with the user.

37. The system according to claim 29, wherein the user identity data is associated with a MSISDN number, a part of a MSISDN number, a fixed IP address, or an ID defined by or associated with the user.

38. The system according to claim 29, wherein the computer operations program, module or code includes coding for a process of verifying a user's identity a) prior to granting a user access to the platform and/or b) after granting a user access to the platform.

39. A method of using an internet platform connected to a communications network, said method comprising:
   a) accepting a user ID for access to the internet platform through an interface;

b) receiving at the platform a symbol command message including a smart symbol command from a user, wherein the smart symbol command comprises a basic symbol command and at least one of a functional command or a keyword command that modifies the basic symbol command, wherein the functional command defines a quantitative parameter of a good or service associated with the basic symbol command, and the keyword command defines a qualitative parameter of a good or service associated with the basic symbol command;

c) comparing at the platform at least a part of the symbol command message to a symbol command directory associated with a database having a plurality of basic symbol commands that are associated with one or more goods or services, and one or more functional and keyword commands; and d) bypassing an internet website to directly implement a response by the platform based on the symbol command message to prevent a direct interfacing between the user and a separate vendor implementing the response.

40. The method according to claim 39, wherein the response includes distributing a good or service associated with the basic symbol command according to the at least one functional command or keyword command in the symbol command message.

41. The method according to claim 39, wherein the response includes processing of a purchase of a good or service associated with the basic symbol command according to the at least one functional command or keyword command in the symbol command message.

42. The method according to claim 39, wherein the response includes sending a request for information associated with the symbol command message.

43. The method according to claim 39, wherein the comparing includes comparing the smart symbol command in the symbol command message with one or more smart symbol commands, keyword commands or function commands listed in the database of the symbol command directory.

44. The method according to claim 39, wherein the accepting a user ID for access step includes verifying the identity of a user.

45. The method according to claim 41, wherein the processing of a purchase includes verifying the identity of a user.

46. The method according to claim 44 or 45, wherein the verifying the identity of a user includes authenticating a user through sending an IN, SMS, MMS or email message to the user requesting a PIN or other authentication response from the user.

47. The method according to claim 44 or 45, wherein the verifying the identity of a user includes a comparing of the user identity with data associated with a user profile at the platform, said data associated with a) a phone number, b) a fixed IP address, c) an identifier defined by the user, or d) another identifier associated with the user.

48. The method according to claim 47, wherein the phone number is a MSISDN number.

49. The method according to claim 39, wherein the response includes sending information for presentation to the user through the interface.

50. The method according to claim 39, wherein the response includes sending information for presentation to the user through an IN, SMS, MMS or email message.

51. The method according to claim 50, wherein the information for presentation to the user sent through an IM, SMS, MMS or email message includes information in a bar code format.

52. The method according to claim 39, wherein the response by the platform is associated with location information for locating or delivering goods or services distributed using the platform.

53. The method according to claim 52, wherein the location information is associated with a telelocation.

54. The method according to claim 52, wherein the location information is associated with a global positioning system location.

55. The method according to claim 52, wherein the location information is associated with an E911 location.

56. The method according to claim 52, wherein the location information is associated with an HLR or VLR registry in a GSM network.

57. The method according to claim 52, wherein the location information is associated with a geographic variable location.

58. The method according to claim 39, wherein the interface is a webpage.

59. The method according to claim 58, wherein the webpage has an input field for receiving entry of a symbol command message.

60. The method according to claim 41, wherein the purchase includes a single-click process associated with the purchase.

* * * * *